United States Patent
Lee et al.

(10) Patent No.: US 12,519,751 B2
(45) Date of Patent: Jan. 6, 2026

(54) SYSTEM AND METHOD FOR CONTROLLING AND EXECUTING ANOMALY COMMANDS IN MULTI-NETWORK ENVIRONMENT

(71) Applicant: SAMSUNG SDS CO., LTD., Seoul (KR)

(72) Inventors: Kwang Hee Lee, Seoul (KR); Kwang Hui Hong, Seoul (KR); Han Soo Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 55 days.

(21) Appl. No.: 18/678,832

(22) Filed: May 30, 2024

(65) Prior Publication Data
US 2024/0406140 A1    Dec. 5, 2024

(30) Foreign Application Priority Data
May 31, 2023  (KR) ........................ 10-2023-0069827

(51) Int. Cl.
*H04L 9/40*  (2022.01)

(52) U.S. Cl.
CPC ........ H04L 63/0236 (2013.01); H04L 63/083 (2013.01); H04L 63/0876 (2013.01)

(58) Field of Classification Search
CPC ............... H04L 63/0236; H04L 63/083; H04L 63/0876; H04L 63/1425; H04L 63/1408; H04L 9/3213; H04L 63/20; G06F 2009/45587

See application file for complete search history.

(56) References Cited

U.S. PATENT DOCUMENTS

| | | |
|---|---|---|
| 10,511,584 B1 | 12/2019 | Baer et al. |
| 2017/0201541 A1* | 7/2017 | Kapoor ............... H04L 43/0876 |
| 2018/0152448 A1 | 5/2018 | Fitzgerald et al. |
| 2020/0304502 A1 | 9/2020 | Jafari et al. |
| 2022/0337591 A1 | 10/2022 | Ponkanen et al. |
| 2023/0132559 A1 | 5/2023 | Ishihara et al. |
| 2024/0089279 A1* | 3/2024 | Jayaraman .......... H04L 63/1425 |

FOREIGN PATENT DOCUMENTS

| | | |
|---|---|---|
| KR | 10-2118380 B1 | 6/2020 |
| KR | 10-2230443 B1 | 3/2021 |

* cited by examiner

*Primary Examiner* — Huan V Doan
(74) *Attorney, Agent, or Firm* — Sughrue Mion, PLLC

(57) ABSTRACT

A method of controlling and executing an anomaly command in a multi-network environment is includes: extracting a command, which is input by a user to a target instance through an accessed bastion worker; determining whether the extracted command is an anomaly command by comparing the extracted command with anomaly command patterns; based on the extracted command being determined to be the anomaly command, determining whether an execution of the anomaly command is permitted in the target instance; and based on the execution of the anomaly command being not permitted, notifying the user of a procedure for approving the execution of the anomaly command based on a level of the anomaly command being one of levels, which are classified in advance based on the anomaly command patterns; either executing or blocking the command input by the user, wherein the procedure is determined differently depending on the level of the anomaly command.

20 Claims, 10 Drawing Sheets

SYSTEM AND METHOD FOR CONTROLLING AND EXECUTING ANOMALY COMMANDS IN MULTI-NETWORK ENVIRONMENT

CROSS-REFERENCE TO RELATED APPLICATION

This application claims priority from Korean Patent Application No. 10-2023-0069827 filed on May 31, 2023 in the Korean Intellectual Property Office, and all the benefits accruing therefrom under 35 U.S.C. 119, the contents of which in its entirety are herein incorporated by reference.

BACKGROUND

1. Field

The present disclosure relates to a system and method for controlling and executing an anomaly command in a multi-network environment, and more specifically, to a system and method for controlling and executing an anomaly command input to instances located in a plurality of networks when accessing the instances via a single bastion host in a cloud service.

2. Description of the Related Art

Typically, connecting to instances within a network such as a Virtual Private Cloud (VPC) in cloud services requires a public IP. However, the number of public IPs is limited, and using public IPs exposes internal instance information to the outside, making it vulnerable to security threats. To mitigate this, users can connect instances within the internal network of a cloud service via a bastion host, which acts as a gateway between external and internal networks.

The bastion host needs to be installed across all networks where instances desired by the users are configured. Thus, the users need to directly manage all account information for connecting to the internal instances and execute Secure Shell (SSH) tunneling whenever connecting to each instance. Additionally, the bastion host only serves as an access proxy, does not control the commands input by the users.

Therefore, instances in networks with the bastion host installed are at risk of security threats from malicious users, and to prevent this, the installation of an agent on each instance is required, which, however, is cumbersome. Accordingly, there is a demand for an anomaly command control/execution method in a multi-network environment that uses the bastion host, but can minimize the exposure of information of instances located in various networks and facilitate the control of anomaly commands input to instances without the need for additional agent installation.

SUMMARY

Aspects of the present disclosure provide a system and method for controlling and executing an anomaly command in a multi-network environment, allowing for the registration and management of anomaly command patterns through a bastion host.

Aspects of the present disclosure also provide a system and method for controlling and executing an anomaly command in a multi-network environment, capable of setting different levels for anomaly commands based on their impact on each system and each user's authority, and establishing different procedures for execution according to the level of the anomaly commands.

Aspects of the present disclosure also provide a system and method for controlling and executing an anomaly command in a multi-network environment, eliminating the need for installing an agent on each instance and enabling the recording of request history and execution history of anomaly commands.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of an example embodiment of the present disclosure, provided is a method of controlling and executing an anomaly command in a multi-network environment, performed by a computing device, the method including: accessing, through a bastion host, one of a plurality of bastion workers, located in subnets of a plurality of networks, and connecting to a target instance that is connected with the accessed bastion worker; extracting a command, which is input by a user to the target instance through the accessed bastion worker; comparing the extracted command with anomaly command patterns stored in the bastion host, and determining whether the extracted command is an anomaly command based on a result of the comparing; based on the extracted command being determined to be the anomaly command, determining whether an execution of the anomaly command is permitted in the target instance; based on the execution of the anomaly command being not permitted, notifying, through the bastion host, the user that the execution of the anomaly command is blocked; and notifying the user of a procedure for approving the execution of the anomaly command based on a level of the anomaly command being one of levels, which are classified in advance based on the anomaly command patterns, and either executing or blocking the command input by the user, wherein the procedure is determined differently depending on the level of the anomaly command.

The connecting to the target instance may include: completing user authentication by connecting to a bastion Equipment Account Management System (EAMS); issuing a request to connect to the target instance through a bastion manager; issuing, by the bastion manager, a request for connection specifications to the bastion EAMS in response to the request to connect to the target instance; generating and transmitting, by the bastion EAMS, the connection specifications to the bastion manager in response to the request for connection specifications; searching for and finding a bastion worker, among the plurality of bastion workers, that is connectable to the target instance; and accessing the found bastion worker by transmitting the connection specifications. The connection specifications may include a domain of a network in which the target instance is located, an IP address and a port number of the target instance, an ID and a password of the user, and an anomaly command verification token.

The extracting the command may include: opening, by the accessed bastion worker, a terminal for the user by executing an application programming interface (API); inputting, by the user, the command through the terminal; transmitting, by a bastion Equipment Account Management System (EAMS), the command input by the user to the accessed bastion worker, wherein the command input by the user is in an image format; and extracting, by the accessed bastion worker, the command input by the user in text form by executing an API.

The levels of the anomaly command classified in advance may include a first level, a second level, and a third level. Based on the level of the anomaly command being the first level, the procedure may be a first procedure for approving an execution of the anomaly command of the first level. Based on the level of the anomaly command being the second level, the procedure may be a second procedure for approving an execution of the anomaly command of the second level. Based on the level of the anomaly command being the third level, the execution of the anomaly command may be blocked.

The level of the anomaly command may be the second level, and the either executing or blocking the command may include: notifying the user that the execution of the anomaly command is blocked and displaying an item to approve the execution of the anomaly command, as the first procedure; in response to the user selecting the item, transmitting, by a bastion manager, an anomaly command verification token to a bastion worker connected with the target instance; checking, by the bastion worker connected with the target instance, a validity of the received anomaly command verification token by comparing the received anomaly command verification token with an initially generated anomaly command verification token generated upon a first access to the target instance; and based on a result of the comparing of the received anomaly command verification token indicating a match, determining the received anomaly command verification token as being valid and executing the anomaly command.

The level of the anomaly command is the second level, and the either executing or blocking the command input may include: notifying the user that the execution of the anomaly command is blocked and displaying an item to request an approval of the execution of the anomaly command, as the second procedure; in response to the user selecting the item, issuing, by a bastion manager, an approval request to a higher-level administrator of the user; based on an approval from the higher-level administrator, transmitting an anomaly command verification token to a bastion worker connected with the target instance; checking, by the bastion worker connected with the target instance, a validity of the received anomaly command verification token by comparing the received anomaly command verification token with an initially generated anomaly command verification token generated upon a first access to the target instance; and based on the result of the comparing of received anomaly command verification token indicating a match, determining the received anomaly command verification token as being valid and executing the anomaly command.

The level of the anomaly command may be the third level, the either executing or blocking the command may include notifying the user that the execution of the anomaly command is blocked.

The method may further include: recording a history of anomaly command execution requests in a storage; and recording a history of anomaly command executions in the storage, wherein the history of anomaly command execution requests includes an IP address of the target instance, an IP address and account information of the user, a time when the user requested the execution of the anomaly command, the level of the anomaly command, and a pattern of the anomaly command, and wherein the history of anomaly command executions includes a time when the user completed the procedure, a time when the user executed the anomaly command, the level of the anomaly command, and the pattern of the anomaly command.

The level of the anomaly command may be additionally determined differently depending on a rank of the user.

According to an aspect of an example embodiment of the present disclosure, provided is a system for controlling and executing an anomaly command in a multi-network environment, including: a plurality of networks each including a subnet, the subnet including a bastion worker and a plurality of instances connected with the bastion worker; and a user network including a bastion host for a user to access bastion workers of the plurality of networks, wherein the bastion host includes a bastion Equipment Account Management System (EAMS) configured to transmit a request to connect to a target instance among the plurality of instances and includes anomaly command patterns for determining whether a command input by the user is an anomaly command; and a bastion manager configured to search for and find a bastion worker connected with the target instance in response to the request to connect to the target instance from the bastion EAMS, and access the found bastion worker, wherein the accessed bastion worker is configured to determine whether the command input by the user to the target instance is the anomaly command, and notify the user, through the bastion manager, of a procedure for approving an execution of the anomaly command, based on a level of the anomaly command being one of levels, which are classified in advance by the anomaly command patterns, and the procedure may vary depending on the level of the anomaly command.

The command input by the user may be transmitted to the accessed bastion worker via WebSocket and output in a form of an image, and the accessed bastion worker may be configured to extract a command from the command output in the form of the image, compare the extracted command with the anomaly command patterns stored in the bastion EAMS, and determine the command input by the user as the anomaly command based on a result of comparing indicating a match.

The bastion EAMS may be configured to generate an anomaly command verification token based on the user first connecting to the target instance and transmit the anomaly command verification token to the bastion manager, and the bastion manager may include an anomaly command control module, which is configured to transmit the anomaly command verification token to the accessed bastion worker in performing the procedure.

The levels of the anomaly command classified in advance may include a first level, a second level, and a third level, based on the level of the anomaly command being the first level. The procedure may be a first procedure for approving an execution of the anomaly command of the first level. Based on the level of the anomaly command being the second level, the procedure may be a second procedure for approving an execution of the anomaly command of the second level. Based on the level of the anomaly command being the third level, the execution of the anomaly command may be blocked.

The level of the anomaly command may be the first level, and the bastion EAMS may be configured to notify the user that the execution of the anomaly command is blocked, and display an item to approve the execution of the anomaly command, as the first procedure. In response to the user selecting the item, the anomaly command control module may be configured to transmit the anomaly command verification token to the accessed bastion worker, and the accessed bastion worker may be configured to check a validity of the received anomaly command verification token by comparing the received anomaly command verification token with an initially generated anomaly command verification token generated upon a first access to the target instance, and execute the anomaly command based on a result of the comparing of the received anomaly command verification token indicating a match.

The level of the anomaly command may be the second level, and the bastion EAMS may be configured to notify the user that the execution of the anomaly command is blocked, and display an item to request an approval of the execution of the anomaly command, as the second procedure. In response to the user selecting the item, the bastion manager may be configured to transmit an approval request to a higher-level administrator of the user. Based on an approval from the higher-level administrator, the anomaly command control module may be configured to transmit the anomaly command verification token to the accessed bastion worker, and the accessed bastion worker may be configured to check a validity of the received anomaly command verification token by comparing the received anomaly command verification token with an initially generated anomaly command verification token generated upon a first access to the target instance, and execute the anomaly command based on a result of comparison of the received anomaly command verification token indicating a match.

The level of the anomaly command may be the third level, and the bastion EAMS may be configured to notify the user that the execution of the anomaly command is blocked.

The level of the anomaly command may be additionally determined differently depending on a rank of the user.

According to an aspect of an example embodiment of the present disclosure, provided is non-transitory computer-readable recording medium storing computer program, the computer program being executable by at least one processor to perform: accessing, through a bastion host, one of a plurality of bastion workers, located in subnets of multiple networks and connecting to a target instance that is connected with the accessed bastion worker; extracting a command, which is input by a user to the target instance through the accessed bastion worker; comparing the extracted command with anomaly command patterns stored in the bastion host, and determining whether the extracted command is an anomaly command based on a result of the comparing; based on the extracted command being determined to be an anomaly command, determining whether the execution of the anomaly command is permitted in the target instance; based on the execution of the anomaly command not being permitted, notifying the user through the bastion host that the execution of the anomaly command is blocked; and notifying the user of a procedure for approving the execution of the anomaly command based on a level of the anomaly command being one of levels, which are classified in advance based on the anomaly command patterns, and either executing or blocking the command input by the user, wherein the procedure is determined differently depending on the level of the anomaly command.

The levels of the anomaly command classified in advance may include a first level, a second level, and a third level. Based on the level of the anomaly command being the first level, the procedure may be a first procedure for approving an execution of the anomaly command of the first level. Based on the level of the anomaly command being the second level, the procedure may be a second procedure for approving an execution of the anomaly command of the second level. Based on the level of the anomaly command being the third level, the execution of the anomaly command may be blocked.

The level of the anomaly command may be additionally determined differently depending on a rank of the user.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
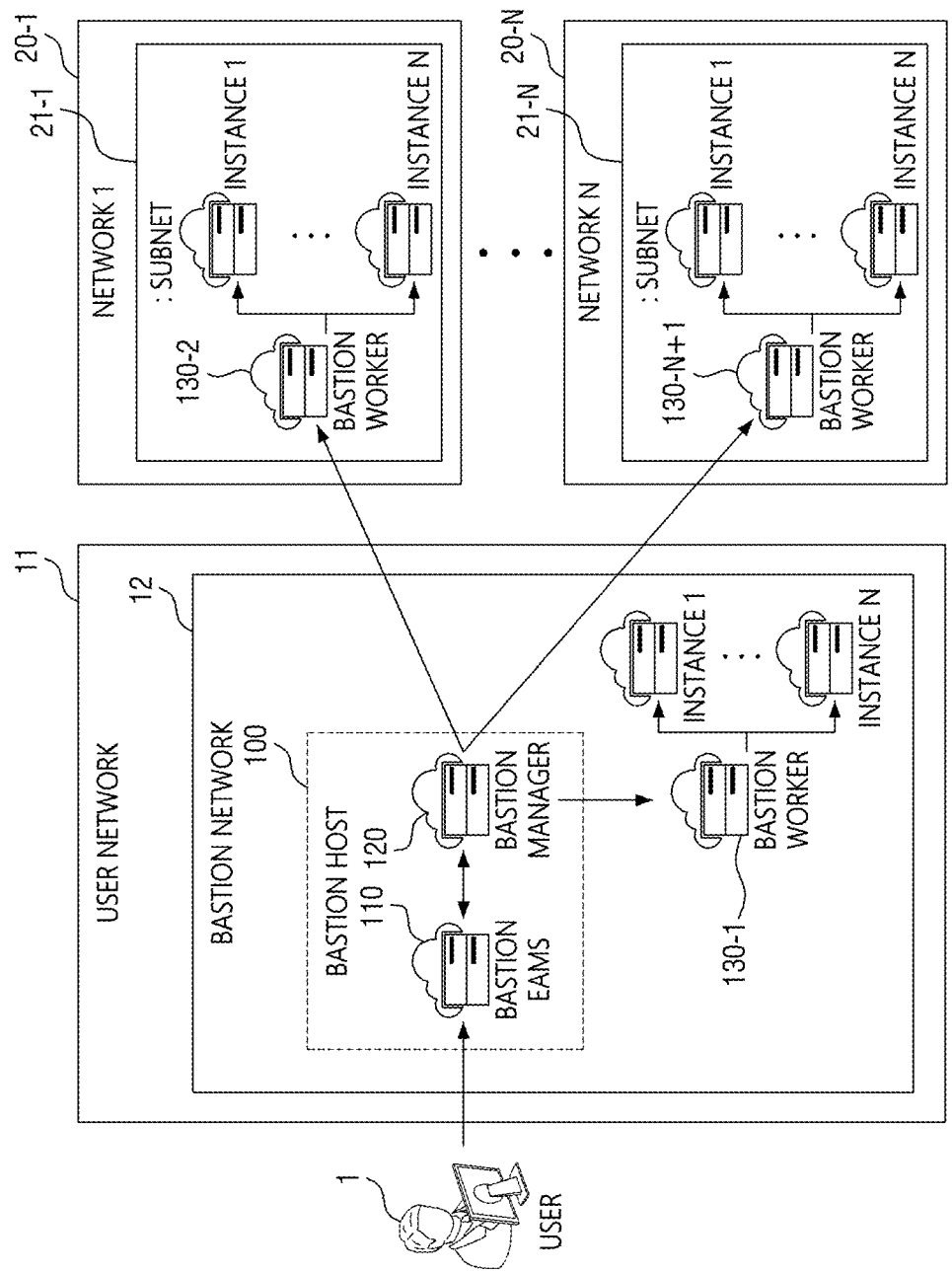
FIG. 1 is a block diagram illustrating a system for controlling and executing an anomaly command in a multi-network environment according to an embodiment of the present disclosure.

Preferred embodiments of the present disclosure will hereinafter be described in detail with reference to the accompanying drawings. The advantages, features, and methods of achieving them of the present disclosure will become clearer with the embodiments described in detail along with the accompanying drawings. However, the present disclosure is not limited to the embodiments described below and can be implemented in various different forms. These embodiments are provided only to make the disclosure complete and fully inform those of ordinary skill in the technical field to which the present disclosure belongs, and the present disclosure is defined only by the scope of the claims.

It is noted that the same reference numerals are used for the same elements across different drawings as far as possible. Furthermore, in describing the present disclosure, detailed descriptions of known configurations or functions will be omitted when they may obscure the essence of the present disclosure.

Unless defined otherwise, all terms used herein (including technical and scientific terms) can have the meaning commonly understood by one of ordinary skill in the art to which the present disclosure belongs. Terms defined in commonly used dictionaries are not interpreted in an ideal or excessive manner unless explicitly defined otherwise. The terms used in the present specification are for the purpose of describing particular embodiments only and are not intended to limit the invention. In this specification, the singular forms include plural forms unless the context clearly indicates otherwise.

Furthermore, in describing the components of the present disclosure, terms such as first, second, A, B, (a), (b), etc., may be used. These terms are intended to distinguish the components from others, and the essence, order, or sequence of such components is not limited by these terms. If a component is stated as being "connected," "coupled," or "linked" to another component, the component can be directly connected or linked to the other component, but it should be understood that there may also exist other components "connected," "coupled," or "linked between them.

The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In this specification, a cloud service refers to an on-demand outsourcing service that provides various IT resources such as a server, storage, and software to users. For example, a cloud service providing a storage saves various data in the storage of a service provider server connected to a network and allows it to be downloaded via the network as needed. Such cloud service may be Infrastructure as a Service (IaaS) that provides a virtualized infrastructure environment to users or Software as a Service (SaaS) that provides application software over the Internet, but the present disclosure is not limited thereto.

In this specification, a command refers to a command input by a user of a cloud service through a web terminal of a browser to be executed in an instance, and an anomaly command refers to a command among such that can damage the instance. For example, a command that deletes all system files in an instance is an anomaly command that can damage the instance.

FIG. 1 is a block diagram illustrating a system 10 for controlling and executing an anomaly command in a multi-network environment according to an embodiment of the present disclosure. Referring to FIG. 1, the system 10 may be, for example, a system for controlling and executing an anomaly command in a multi-network environment in a cloud service, a user 1 may be an administrator of the cloud service, and different ranks (e.g., junior administrator, intermediate administrator, senior administrator, etc.) may be assigned to each user 1. According to an embodiment of the present disclosure, the procedures for controlling and executing an anomaly command may vary depending on the user 1's rank.

Referring to FIG. 1, the system 10 may include a user network 11 and a plurality of networks 20-1 through 20-N, the user network 11 may include a bastion subnet 12, and each of the networks 20-1 through 20-N may include subnets 21-1 through 21-N. The bastion subnet 12 may include a bastion host 100, and each of the bastion subnet 12 and the subnets 21-1 through 21-N may include one of bastion workers 130-1 through 130-N+1 and a plurality of instances. The bastion workers 130-1 through 130-N+1 and the plurality of instances may have distinct IP addresses.

Each network is illustrated in FIG. 1 as including a single subnet, but the present disclosure is not limited thereto. Alternatively, each network may include a plurality of subnets. Also, FIG. 1 illustrates that each subnet includes N instances, but the present disclosure is not limited thereto. The number of instances included in each subnet may vary.

The user 1 may access the user network 11 and may thereby connect to the instances connected with each of the bastion workers 130-1 through 130-N+1 through a single bastion host 100, which is positioned in the bastion subnet 12. For convenience of description, any arbitrary bastion worker or all the bastion workers 130-1 through 130-N+1 will hereinafter be collectively referred to as the bastion worker(s) 130.

The user 1 may access the user network 11 through a browser on their user terminal. For example, the user terminal may include a smartphone, tablet PC, laptop, etc., but the present disclosure is not limited thereto. The user terminal may encompass any type of computing device equipped with computing and communication means. Moreover, the user network 11 and the networks 20-1 through 20-N may be virtual private cloud (VPC) networks, on-premise networks, or cloud service provider (CSP) networks, but the present disclosure is not limited thereto. The user network 11 and the networks 20-1 through 20-N may communicate through an Internet gateway or using VPC peering for communication.

The user network 11 is a network that enables the user 1 to connect to, and manage connections to, instances in a multi-network environment, and may include the bastion subnet 12 and the bastion host 100. The bastion subnet 12 is a subnet within the user network 11 that includes the bastion host 100. The bastion host 100 may include a bastion Equipment Account Management System (EAMS) 110 and a bastion manager 120. For example, the user 1 may access the user network 11 via HyperText Transfer Protocol Secure (HTTPS).

As mentioned above, the user 1 may access the bastion workers 130-1 through 130-N+1, which are located in the bastion subnet 12 or in the subnets 21-1 through 21-N through the bastion host 100, and may connect to the instances connected with each of the bastion workers 130-1 through 130-N+1. An instance that the user 1 wishes to connect to will hereinafter be referred to as a target instance. After connecting to the target instance, the user 1 may input a command to be executed in the target instance via a web terminal in their browser.

The bastion EAMS 110 performs user authentication on the user 1 who has connected thereto via the browser, manages information related to user authentication, and upon successful authentication of the user 1, may send a request to the bastion manager 120 to connect to the target instance. Additionally, the bastion EAMS 110 may include information on anomaly command patterns, and based on the information on anomaly command patterns, may determine the level of anomaly commands based on their potential impact on each network and the user 1's rank. Also, the bastion EAMS 110 may store the history of anomaly command execution requests and execution history in a storage 2.

The bastion manager 120 may hold information on the bastion workers 130-1 through 130-N+1 that are deployed. Upon a connection request from the bastion EAMS 110, the bastion manager 120 may search for and find the bastion worker 130 connected with the target instance, may send a request for connection specifications, which are connection-related information (e.g., the IP address of the target instance, the user 1's ID and password, anomaly command settings, etc.), to the bastion EAMS 110, and may deliver connection traffic and generated connection specifications to the found bastion worker 130 to access the corresponding bastion worker 130. Furthermore, the bastion manager 120 may monitor connections to the target instance to measure traffic or review connection records. Additionally, if a command input by the user is an anomaly command, the bastion manager 120 may manage the procedure for approving the execution of the input command.

A bastion worker 130 may access connected instances based on the connection traffic and the user 1's connection specifications, received from the bastion manager 120. For example, the bastion worker 130 may be deployed in the subnets 21-1 through 21-N as a container image by the bastion EAMS 110 and the bastion manager 120. Additionally, the bastion worker 130 may open a terminal for the execution for commands for the user 1 by executing an API, and may extract the command input by the user 1 on the opened terminal to determine whether the input command is an anomaly command.

Furthermore, FIG. 1 illustrates that each of the bastion subnet 12 and the subnets 21-1 through 21-N includes a single corresponding bastion worker, i.e., the bastion subnet 12 includes the bastion worker 130-1, while the subnets 21-1 through 21-N include the bastion workers 130-2 through 130-N+1, respectively, but the present disclosure is not limited thereto. The number of bastion workers may be dynamically adjusted depending on, for example, the traffic of each subnet. For example, if the traffic of the subnet 21-1 increases beyond a predefined threshold, causing an increase in the load on the bastion worker 130-1, an additional bastion worker may be deployed in the subnet 21-1 to reduce the number of instances connected with each bastion worker 130, thereby distributing the load. Conversely, if the traffic of the subnet 21-1 decreases, the additional bastion worker 130 may be removed.

In an embodiment of the present disclosure, the bastion EAMS 110 and the bastion manager 120 may be implemented as separate web servers, and the bastion EAMS 110 and the bastion manager 120 may communicate with each other bidirectionally. However, communication between the bastion manager 120 and the bastion workers 130 is restricted to unidirectional, from the bastion manager to the bastion workers, with communication from the bastion workers to the bastion manager being blocked. Thus, the user network 11 can be inaccessible from the outside, minimizing security risks.

Figure 2:
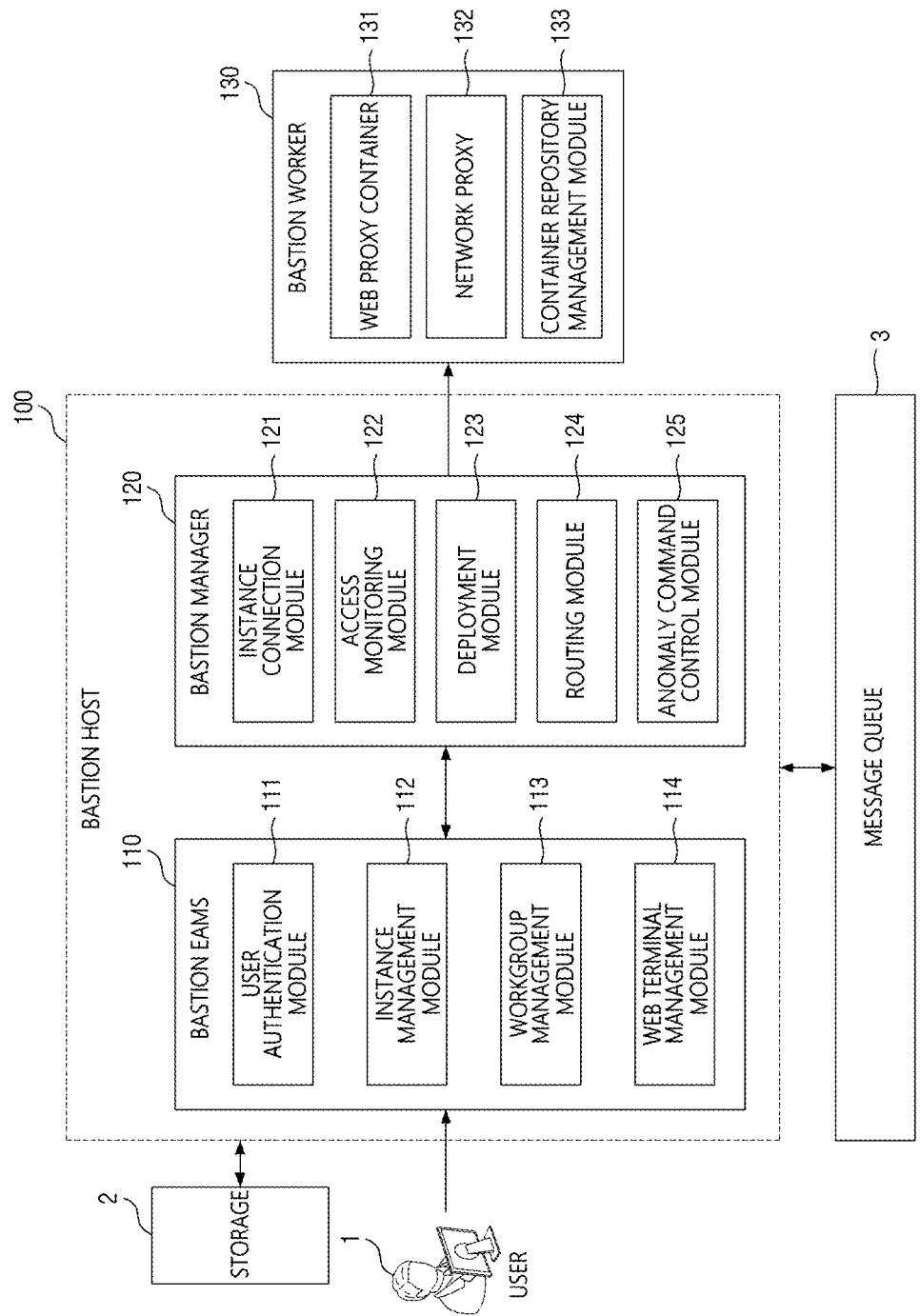
FIG. 2 is a block diagram illustrating the configuration of a bastion host and a bastion worker according to an embodiment of the present disclosure.

FIG. 2 is a block diagram illustrating the configuration of the bastion host 100 and a bastion worker 130 according to an embodiment of the present disclosure. The components (or modules) of each of the bastion EAMS 110, the bastion manager 120, and the bastion worker 130 of FIG. 2 represent functionally distinct elements, and it should be noted that at least one component (or module) of each of the bastion EAMS 110, the bastion manager 120, and the bastion worker 130 may be physically integrated with one another in a real-world physical environment.

The bastion EAMS 110 may provide a page for connection management and web terminal settings through the mapping between the user 1 and a target instance, and may include user authentication- and instance-related information. The bastion manager 120 and the bastion worker 130 perform an operation for an actual instance connection. Specifically, the bastion manager 120 may transmit connection traffic to the bastion worker 130 in a multi-network environment based on information received from the bastion EAMS 110, and the bastion worker 130, located in the same subnet as the target instance, may proceed with instance authentication and connection.

After connecting to the target instance, the user 1 may input a command to the terminal opened by the bastion worker 130 connected with the target instance. The bastion worker 130 may execute an API to extract and determine whether the input command is an anomaly command, and the execution of anomaly commands may be controlled. The individual components and their operations of each of the bastion EAMS 110, the bastion manager 120, and the bastion worker 130 will hereinafter be described.

The bastion EAMS 110 includes a user authentication module 111, which is for performing user authentication (e.g., authentication through the user 1's ID and password, biometric authentication, authentication through electronic signature, etc.) and managing user authentication-related information, an instance management module 112, which is for storing information of instances included in networks (e.g., IP addresses) and sending a request to connect to target instance, a workgroup management module 113, which is for managing the user 1's workgroups, and a web terminal management module 114, which is for managing the web terminal on which the bastion EAMS 110 operates. Additionally, as will be described later, the bastion EAMS 110 may generate connection specifications upon a request from the bastion manager 120.

The bastion EAMS 110 may store patterns of anomaly commands and may determine whether the command input by the user 1 is an anomaly command by comparing the input command with anomaly command patterns stored in the bastion EAMS 110. If the command input by the user 1 is identified as an anomaly command, the bastion EAMS 110 may control the execution of the input command using a blacklist method. For example, the control of anomaly commands may be performed differently depending on the level of the anomaly commands. For example, the levels of anomaly commands may be classified, in consideration of their potential impact on each system, into a user-confirmed level, an administrator-confirmed level, and a never-executed level. For example, the levels of anomaly commands may be classified based on the anomaly command patterns that matches with the anomaly commands.

A user-confirmed-level command refers to a command that requires verification by the user 1 before execution, an administrator-confirmed-level command refers to a command that requires approval by an administrator higher than the user 1, and a never executed level command refers to a command that should never be executed (for example, a command that formats all files in the target instance). Even for commands at the same level, the permission to execute anomaly commands may be set differently depending on the user 1's rank. However, the present disclosure is not limited to this. Even if the levels of anomaly commands are classified in a different manner from that described above, the procedure for controlling first-level anomaly commands may differ from the procedure for controlling second-level anomaly commands.

In this manner, the anomaly command patterns stored in the bastion EAMS 110 and the classification of the levels of anomaly commands may be applied uniformly to all instances in an entire multi-network environment, thus enabling a uniform control of anomaly commands without the need for installing an agent on each instance.

The bastion manager 120 may include an instance connection module 121, which is for searching for the bastion worker 130 connected with the target instance, and requesting and delivering connection specifications needed for connecting to the target instance. For example, the connection specifications may include: connection information such as a target network domain necessary for connecting to the target instance, the IP address and port number of the target instance, and the user 1's ID and password; security policies such as anomaly command settings, an anomaly command verification token, watermark display, and connection history recording settings; and web terminal settings such as terminal timeout duration, the activation status of a file transfer functionality, and scroll line settings. The anomaly command verification token, which is a token for verifying whether the procedure for executing an anomaly command that is to be executed is valid, may be issued at each instance access and may be used when controlling and executing an anomaly command. For example, the instance connection module 121 may deliver the connection specifications in JSON format to the bastion worker 130 connected with the target instance.

Additionally, the bastion manager 120 may include an access monitoring module 122, which is for, in response to an access monitoring request from the user 1, measuring traffic within each subnet, downloading a connection log file, and playing a connection history file. In this specification, the connection log file refers to a file containing operations performed by the user 1 upon connecting to an arbitrary target instance, and the connection history file refers to a video file recording operations performed through the web terminal by the user 1 up to the point of connecting to the arbitrary target instance. The connection log file and the connection history file may be stored in an external storage 2. Meanwhile, the measured traffic may be used to adjust the number of bastion workers 130 on each subnet.

Furthermore, the bastion manager 120 may include a deployment module 123, which is for distributing the bastion workers 130 as container images across networks, a routing module 124, which is for routing traffic to the deployed bastion workers 130 across the networks, and an anomaly command control module 125, which is for executing the procedure for controlling an anomaly command input by the user 1.

The deployment module 123 may perform a deployment operation based on certificates (e.g., an x.509 certificates (SAN:*.connector.io)) issued between the bastion manager 120 and the bastion workers 130. The routing module 124 may distribute load in a least connection manner using a dynamic routing method that preferentially routes traffic to bastion workers 130 with fewer concurrent connections. However, the routing module 124 may also use a static routing method in anticipation that particular bastion workers 130 are down. Through such traffic routing, the bastion manager 120 may access the bastion worker 130.

If the command input by the user 1 is an anomaly command, the anomaly command control module 125 may execute the procedure for controlling the anomaly command based on the level of the anomaly command. For example, if the execution of a user-confirmed-level anomaly command is requested, the anomaly command control module 125 may display a popup for confirmation on the web terminal, and if the execution of an administrator-confirmed-level anomaly command is requested, the anomaly command control module 125 may display a popup on the web terminal to request approval from a higher-level administrator.

Referring further to FIG. 2, the bastion worker 130 may include a web proxy container 131 and a network proxy 132. The bastion worker 130 may be implemented in the web proxy container 131 as a container image, and the container image may be received from an external container repository, such as Kubernetes (K8S) or a Docker repository, upon a deployment request from the deployment module 123 of the bastion manager 120. The bastion worker 130 may further include a container repository management module 133, which is for managing the external container repository.

Specifically, the bastion worker 130 may connect to target instance through the network proxy 132 based on the connection specifications and traffic routed from the bastion manager 120. The target instance may proceed with an authentication procedure through a standard Internet protocol (e.g., SSH/RDP protocol, Telnet protocol, etc.), and may provide a terminal screen to the user 1.

Furthermore, as explained earlier with reference to FIG. 1, the number of bastion workers 130 may be dynamically adjusted based on the traffic, load, and network characteristics of each subnet. For example, if the traffic in each subnet exceeds a predefined threshold, the number of bastion workers 130 may be increased, thereby reducing the number of instances connected with each bastion worker 130 and distributing the load. Conversely, if the traffic of the corresponding subnet decreases, the number of bastion workers 130 may be lowered back. The number of bastion workers 130 may be increased or lowered by adjusting the deployment of the bastion workers 130 by the bastion manager 120.

The bastion worker 130 may execute an API to open a web terminal, allowing the user 1 to input a command for the target instance. Moreover, the bastion worker 130 may extract the command input by the user 1 to determine whether the input command is an anomaly command.

For example, the command input by the user 1 may be output in the form of an image on an Html5 Canvas. The bastion worker 130 may execute an API to extract text from the image to retrieve the input command (i.e., the command output as the image). Specifically, the bastion worker 130 may execute an API to extract a command whenever the "enter" key is pressed on the web terminal, and a string that matches a regular expression may be returned.

The bastion worker 130 may determine if the extracted command is an anomaly command based on the anomaly command patterns stored in the bastion EAMS 110. If the extracted command is identified as an anomaly command, the bastion worker 130 may transmit the extracted command to the bastion manager 120 along with information indicating that the extracted command is an anomaly command. Thereafter, the user 1 may be notified of the input command being an anomaly command and of a procedure that needs to be performed for the execution of the input command. Except for a never-executed-level anomaly command, the user 1 may receive approval to execute an anomaly command if a series of actions or operations are properly performed based on the level of the anomaly command.

The validity of the anomaly command verification token included in the connection specifications may be identified for the execution of the input command. Specifically, it may be determined whether an anomaly command verification token (i.e., an initially generated anomaly command verification token) transmitted to the bastion worker 130 when the user 1 first executed an anomaly command matches an anomaly command verification token transmitted to the bastion worker 130 after the user 1 received approval and executed the anomaly command. Then, if these two anomaly command verification tokens match, the anomaly command may be executed because the anomaly command verification tokens are unique strings issued upon first access to the corresponding instance.

All the necessary information and generated files during the operations of the bastion EAMS 110, the bastion manager 120, and the bastion worker 130 may be stored in the storage 2. Moreover, the bastion EAMS 110, the bastion manager 120, and the bastion worker 130 may exchange data through a message queue 3.

The bastion host 100 may be implemented on at least one computing device. For example, all functions of the bastion host 100 may be implemented on a single computing device. Alternatively, in another example, some functions of the bastion host 100 may be implemented on a first computing device, and other functions may be implemented on a second computing device. Yet alternatively, in yet another example, a particular of the bastion host 100 may be implemented across multiple computing devices. Here, the term "computing device" may encompass nearly any arbitrary device equipped with computing capabilities, and an exemplary computing device that can implement the bastion host 100 will be described later with reference to FIG. 10.

Figure 3:
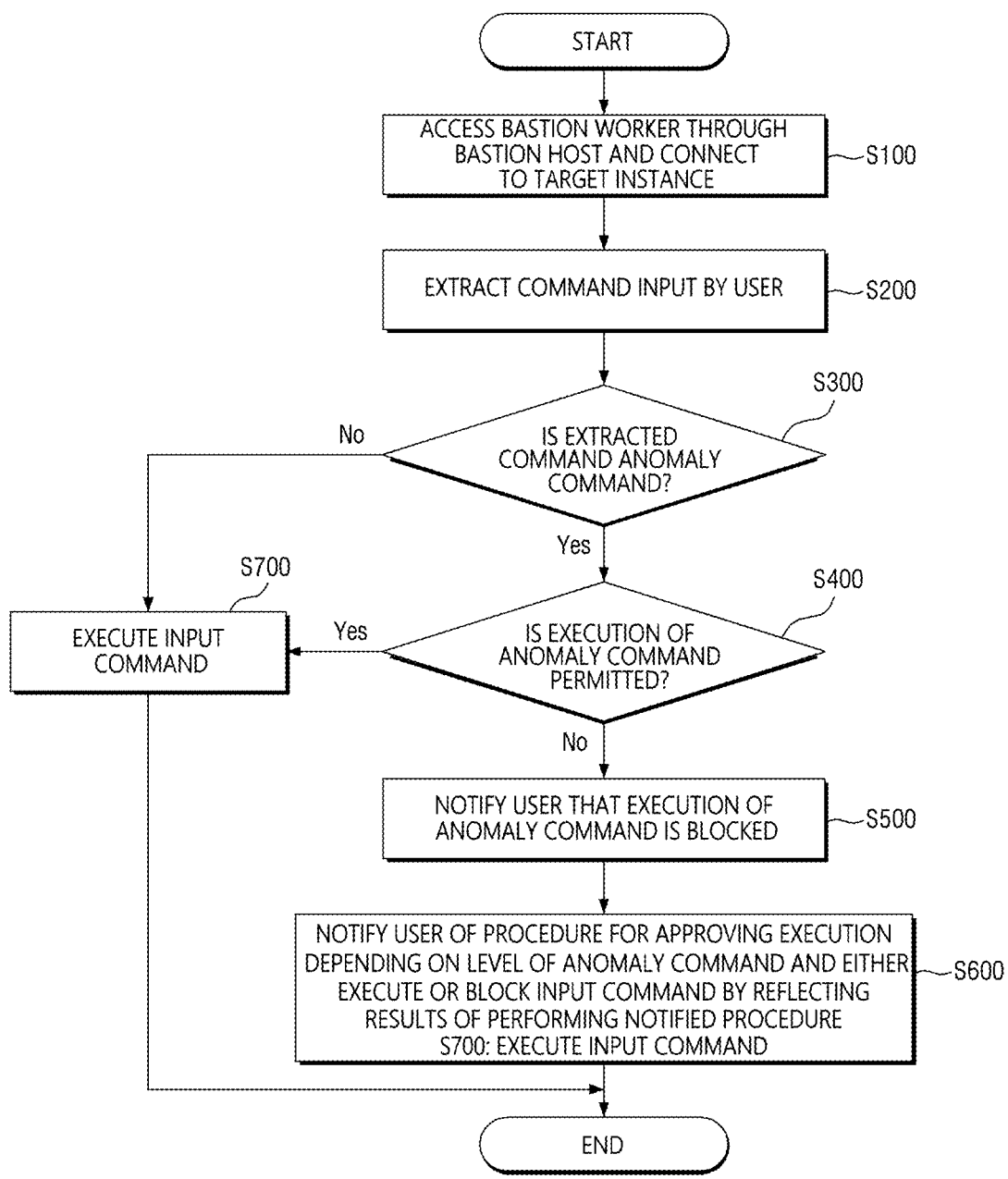
FIG. 3 is a flowchart illustrating a method of controlling and executing an anomaly command in a multi-network environment according to an embodiment of the present disclosure.

FIG. 3 is a flowchart illustrating a method of controlling and executing an anomaly command in a multi-network environment according to an embodiment of the present disclosure. The embodiment of FIG. 3 will hereinafter be described with reference to both FIGS. 1 and 3.

Referring to FIG. 3 and further to FIG. 1, in step S100, the user 1 may access a bastion worker 130 in each of the subnets of multiple networks through the bastion host 100 and may connect to the target instance. For example, the user 1 may access the bastion EAMS 110 first through the browser on the user terminal, may search for and find the bastion worker 130 connected with the target instance through the bastion manager 120, and access the found bastion worker 130 to connect to the target instance among a plurality of instances connected with the bastion worker 130. A series of operations related to step S100 will be described later with reference to FIGS. 4 and 5.

In step S200, the user 1 may input a command to be executed on the target instance through the web terminal, and the bastion worker 130 connected with the target instance may extract the input command. For example, the bastion worker 130 may open a web terminal for the user 1 to input a command by executing an API. The command input by the user 1 may be output in the form of an image (e.g., in the form of Html5 Canvas), and the bastion worker 130 may extract the output command in the form of text form. A series of operations related to step S200 will be described later with reference to reference to FIG. 6.

In step S300, the bastion worker 130 may determine whether the extracted command is an anomaly command. Specifically, if the extracted command matches the anomaly command patterns stored in the bastion EAMS 110, the bastion worker 130 may identify the extracted command as an anomaly command. If the extracted command is determined as not being an anomaly command ("NO"), the input command may be executed in step S700.

If the command extracted in step S300 is determined as being an anomaly command ("YES"), then in step S400, it may be determined whether the execution of anomaly commands is permitted. Specifically, it may be determined whether the execution of anomaly commands is permitted, for example, based on whether the procedure for controlling anomaly commands has already been completed, or based on the user 1's rank. If it is determined that the execution of anomaly commands is permitted ("YES"), the input command may be executed in step S700.

If the execution of anomaly commands is determined in step S400 as not being permitted ("NO"), then in step S500, the bastion manager 120 may notify the user 1 that the execution of anomaly commands is blocked. Thereafter, in step S600, the bastion manager 120 may notify the user 1 of a procedure for approving execution, depending on the level of the input command, and then, the input command may be either executed or blocked from execution based on the results of performing the notified procedure. For example, never-executed-level anomaly commands may be blocked from execution regardless of the notified procedure, unless the user 1 is the highest-level administrator, and user-confirmed-level or administrator-confirmed-level commands may be executed through the confirmation by the user 1 or the approval by a higher-level administrator. A series of operations related to step S600 will be described later with reference to FIGS. 7 through 9.

Figure 4:
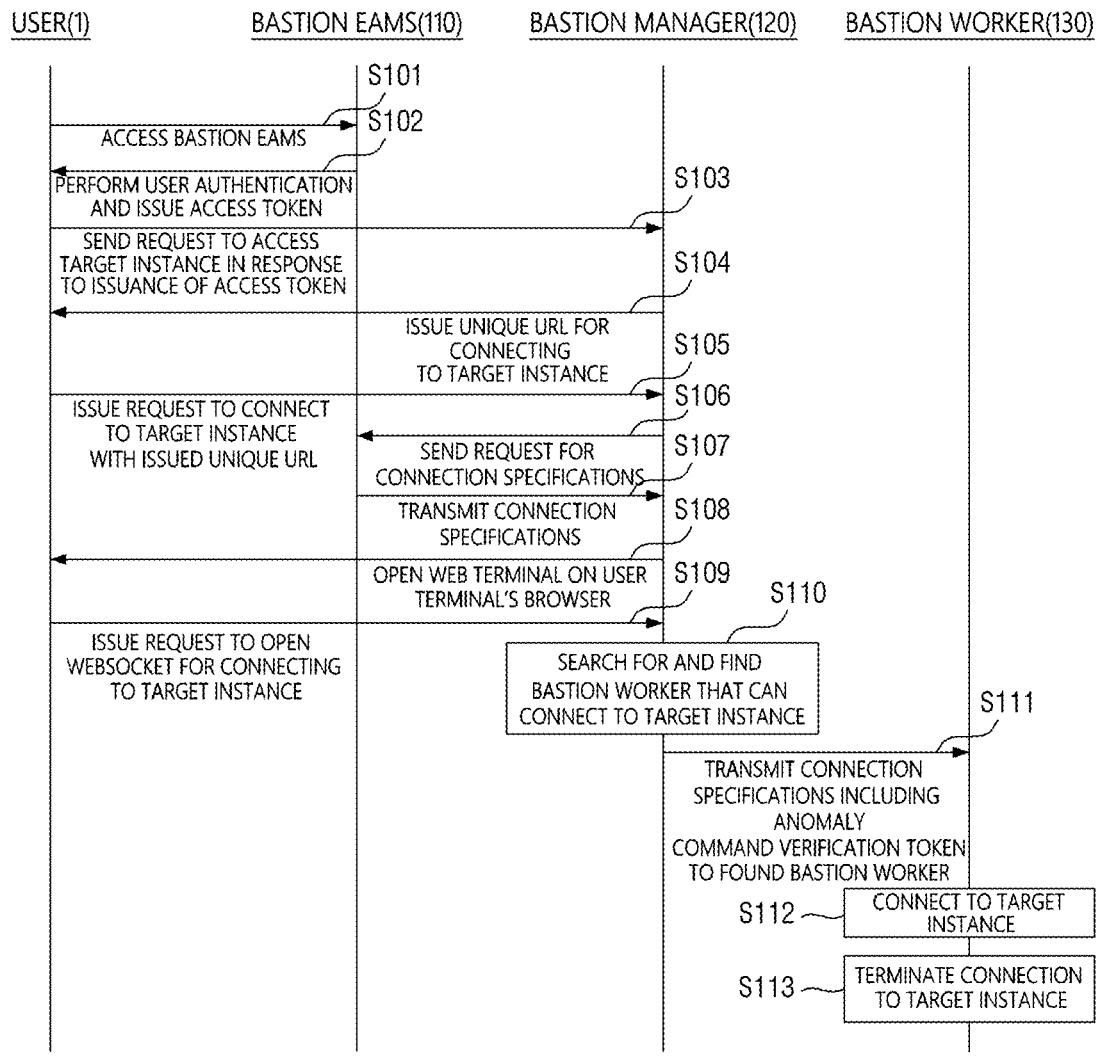
FIG. 4 is a flowchart illustrating step S100 of FIG. 3, which involves accessing the bastion worker through the bastion host and connecting to a target instance.

FIG. 4 is a flowchart illustrating step S100 of FIG. 3, which involves accessing a bastion worker 130 through the bastion host 100 and connecting to the target instance. The embodiment of FIG. 4 will hereinafter be described with reference further to FIGS. 1 and 2.

Referring to FIG. 4 and further to FIGS. 1 and 2, in step S101, the user 1 may access the bastion EAMS 110 through the browser on the user terminal. In step S102, the user authentication module 111 of the bastion EAMS 110 may perform user authentication for the user 1 and, upon completion of user authentication, issue an access token for server-to-server authentication. In step S103, upon issuance of the access token, the user 1 may send a request to connect to the target instance.

In step S104, the instance connection module 121 of the bastion manager 120 may issue a unique URL to the user 1 for connecting to the target instance. For example, the unique URL for access may be in the format of /connector/connectRemoteTerminal/{InstanceID}. An InstanceID value issued upon a connection request is a unique value that may be used as a key value for subsequent access monitoring (for checking the connection log file and connection history file). In step S105, the user 1 may send a request to connect to the target instance with the issued unique URL.

In step S106, the instance connection module 121 of the bastion manager 120 may send a request for connection specifications to the bastion EAMS 110. For example, the connection specifications may include: connection information such as the target network domain necessary for connecting to the target instance, the IP address and port number of the target instance, and the user 1's ID and password; security policies such as anomaly command settings, an anomaly command verification token, watermark display, and connection history recording settings; and web terminal settings such as terminal timeout duration, the activation status of a file transfer functionality, and scroll line settings.

In step S107, the bastion EAMS 110 may generate and deliver the connection specifications to the bastion manager 120.

In step S108, the bastion manager 120 may open a web terminal on the browser of the user terminal. The settings of the web terminal may be managed by the web terminal management module 114 of the bastion EAMS 110. In step S109, the user 1 may send a request to open a WebSocket for connecting to the target instance.

In step S110, the instance connection module 121 of the bastion manager 120 may search for and find a bastion worker 130 that can connect to the target instance from among a plurality of bastion workers 130 deployed across networks. For example, the bastion manager 120 may search for and find accessible bastion workers 130 based on the target network domain included in the connection specification. Specifically, the routing module 124 of the bastion manager 120 may count the number of concurrent connections to the target instance each time a connection is made or terminated, and may route traffic to a bastion worker 130 with the least connections, among the found accessible bastion workers 130.

In step S111, the instance connection module 121 of the bastion manager 120 may deliver the connection specifications to, and thereby access, the bastion worker 130 that can connect to the target instance. For example, the connection specifications may be delivered to the bastion worker 130 in JSON format, but the present disclosure is not limited thereto. Alternatively, the connection specifications may be delivered in any other format for conveying data objects consisting of key-value pairs. In step S112, the bastion worker 130 may connect to the target instance, and in step S113, the bastion worker 130 may terminate the connection to the target instance.

Figure 5:
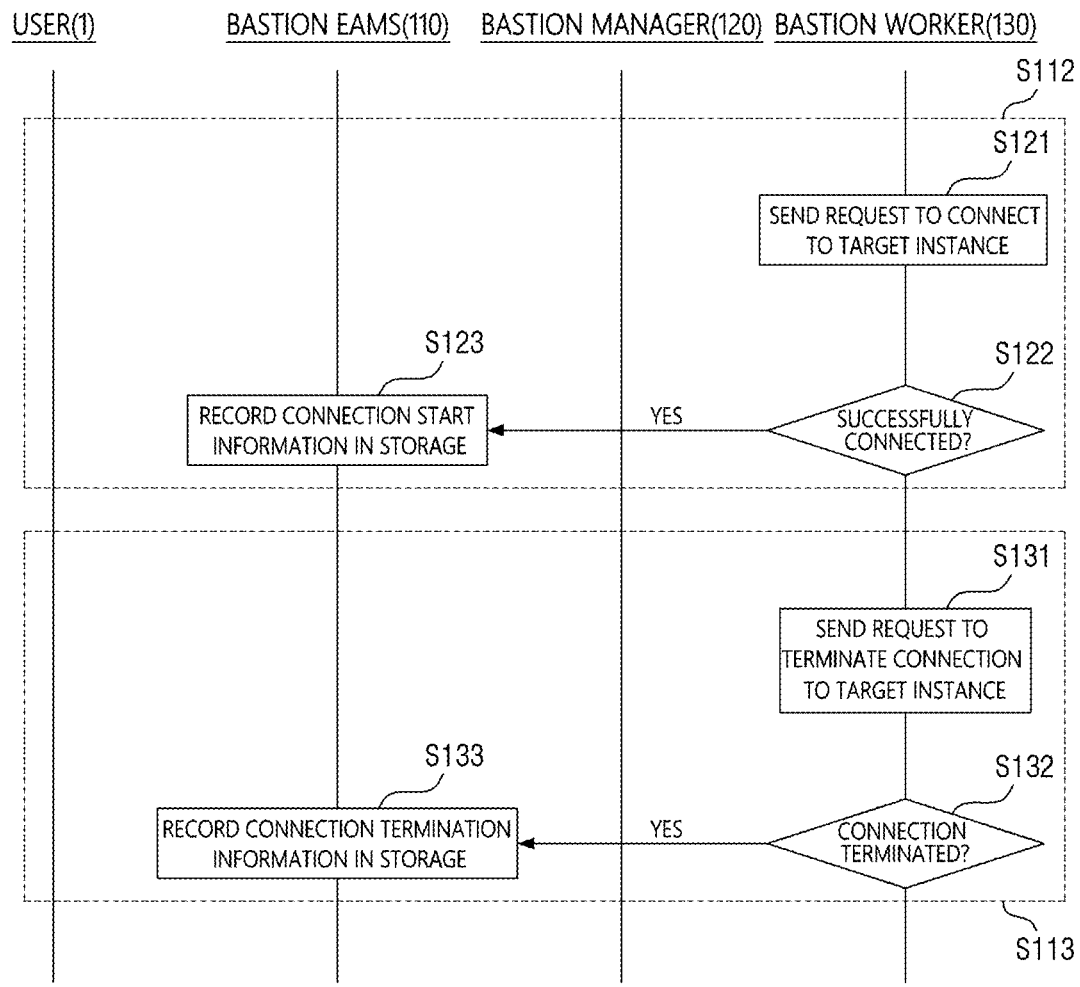
FIG. 5 is a flowchart illustrating steps S112 and S113 of FIG. 4, where the bastion worker connects to, and terminates the connection to, the target instance.

FIG. 5 is a flowchart illustrating steps S112 and S113 of FIG. 4, where the bastion worker 130 connects to, and terminates the connection to, the target instance. The embodiment of FIG. 5 will hereinafter be described with reference further to FIGS. 1 and 2.

Referring to FIG. 5 and further to FIGS. 1 and 2, In step S121, the bastion worker 130 may send a request to connect to the target instance through the network proxy 132, and in step S122, the bastion worker 130 may determine if the connection to the target instance has been successful. If the connection to the target instance has been successful, then in step S123, the bastion EAMS 110 may record connection start information in the storage 2. For example, the connection start information may include the name and IP address of the target instance, connection protocol, the user 1's name, the user 1's account information, the user 1's IP address, the ID of the target instance, and connection start time.

In step S131, the bastion worker 130 may send a request to terminate the connection to the target instance, and in step S132, the bastion worker 130 may determine if the connection to the target instance has been successfully terminated. Upon disconnection from the target instance, in step S133, the bastion EAMS 110 may record connection termination information in the storage 2. For example, the connection termination information may include the name and IP address of the target instance, the connection protocol, the user 1's name, the user 1's account information, the user 1's IP address, the ID of the target instance, and connection termination time.

Figure 6:
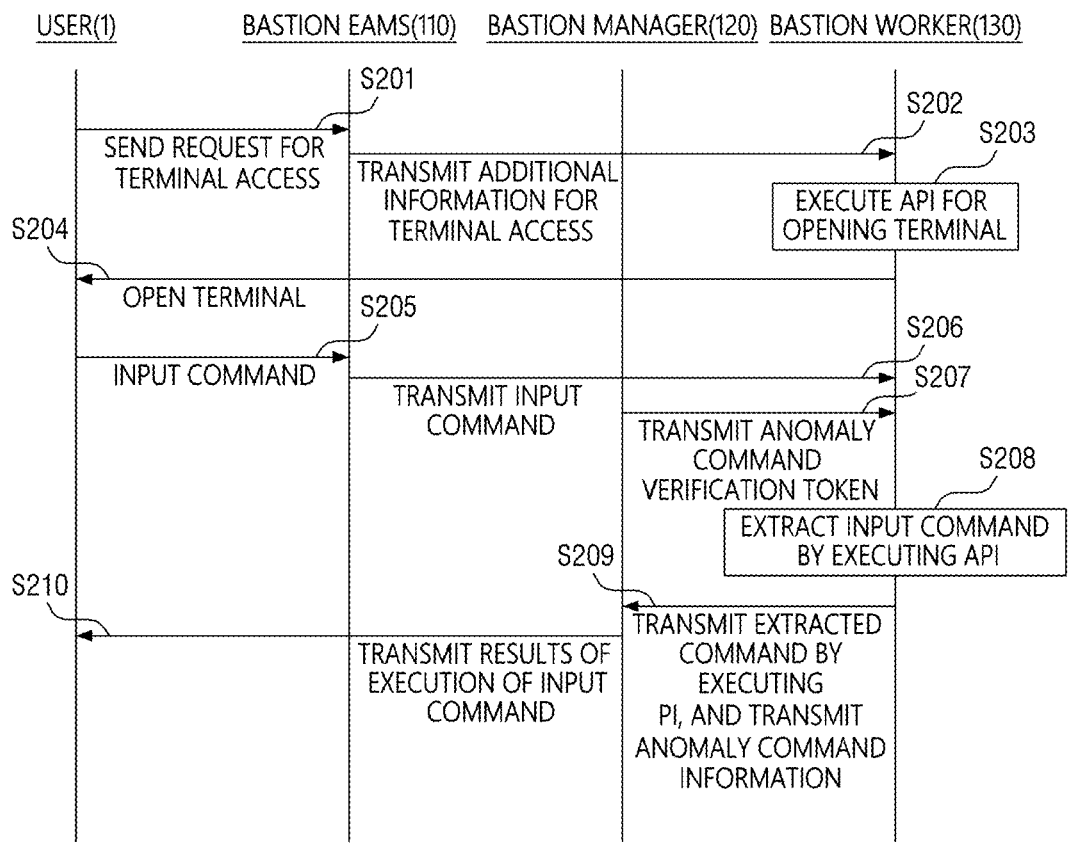
FIG. 6 is a flowchart illustrating step S200 of FIG. 3, which involves extracting a command input by a user.

FIG. 6 is a flowchart illustrating step S200 of FIG. 3, which involves extracting a command input by the user 1.

The embodiment of FIG. 6 will hereinafter be described with reference further to FIGS. 1 and 2.

Referring to FIG. 6 and further to FIGS. 1 and 2, in step S201, after connecting to the target instance, the user 1 may send a request for terminal access to the bastion EAMS 110 for executing a command. In step S202, the bastion EAMS 110 may transmit additional information for terminal access to the bastion worker 130. For example, the additional information may include a regular expression for verifying if the command input by the user 1 is executable from a prompt, the anomaly command patterns stored in the bastion EAMS 110, and an anomaly command verification token. In step S203, the bastion worker 130 may execute an API to open a terminal, and in step S204, a terminal may be opened on the user 1's browser.

In step S205, the user 1 may input a command through the terminal. In step S206, the bastion EAMS 110 may transmit the input command to the bastion worker 130. For example, since the user 1 inputs a command and then presses the "enter" key to execute it, the bastion EAMS 110 may recognize the press of the "enter" key and may transmit the command input before the press of the "enter" key. The command input by the user 1 may be transmitted to the bastion worker 130 via a WebSocket, and may then be output in the form of an image on an Html5 Canvas. Then, in step S207, the bastion manager 120 may transmit the anomaly command verification token, included in the connection specifications, to the bastion worker 130.

In step S208, the bastion worker 130 may execute an API to extract the input command. Specifically, the bastion worker 130 may execute an API capable of extracting text from an image and may thereby extract the command output as an image. In step S209, the bastion worker 130 may execute an API to transmit the extracted command and anomaly command information (e.g., anomaly command level) to the bastion manager 120. Then, in step S210, the bastion manager 120 may transmit the results of the execution of the input command to the user 1, indicating that, for example, the execution of the input command is blocked due to the input command being identified as an anomaly command. Then, the method proceeds to step S500 of FIG. 3.

Figure 7:
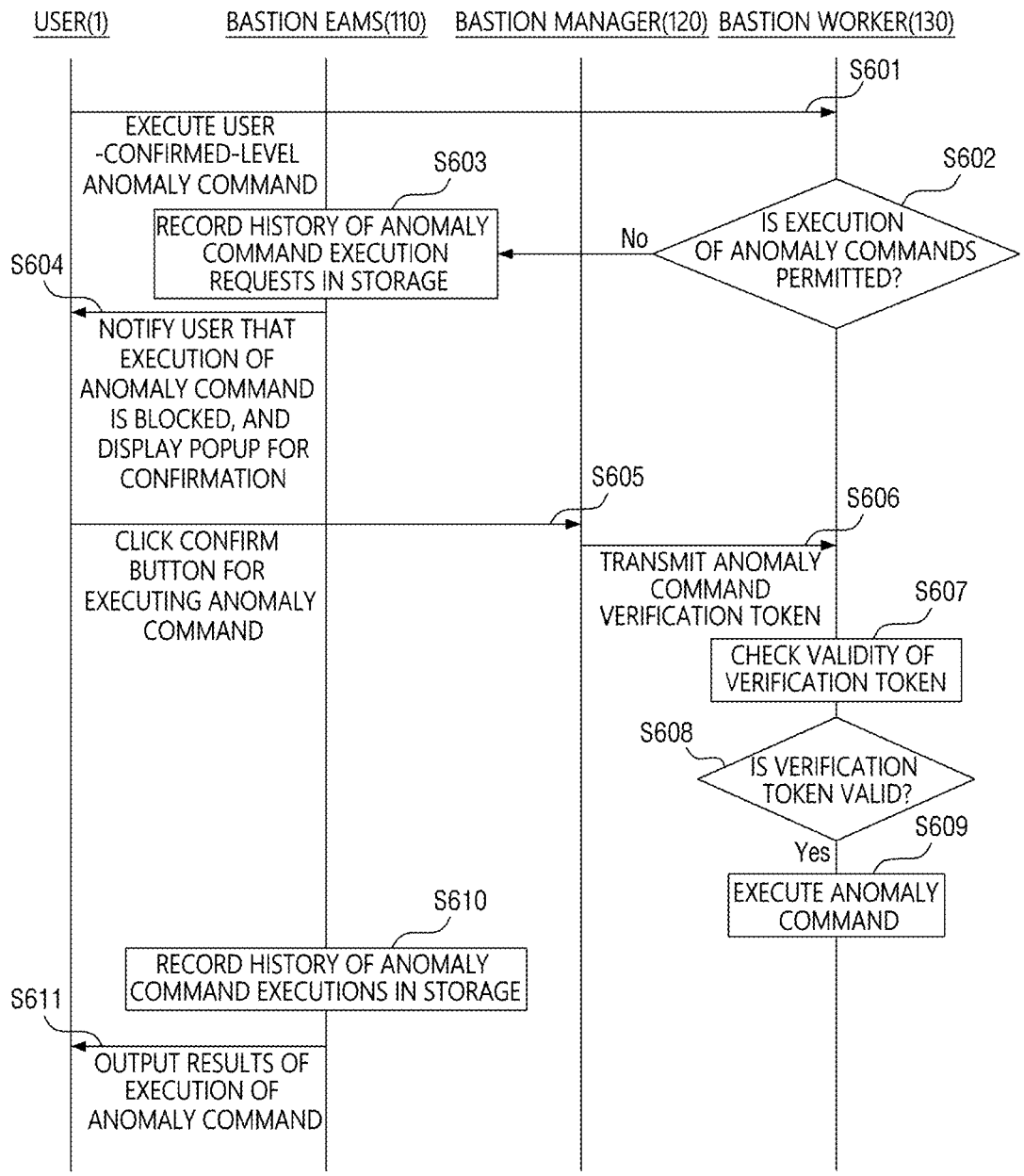
FIG. 7 is a flowchart illustrating step S600 of FIG. 3, which involves notifying the user of a procedure for approving the execution of a user-confirmed-level anomaly command and then either executing or blocking the user-confirmed-level anomaly command by reflecting the results of performing the notified procedure

FIG. 7 is a flowchart illustrating step S600 of FIG. 3, which involves notifying the user 1 of a procedure for approving the execution of a user-confirmed-level anomaly command and then either executing or blocking the user-confirmed-level anomaly command by reflecting the results of performing the notified procedure. Here, the user-confirmed-level anomaly command may be a command that requires verification before execution to prevent inadvertent actions by the user 1. Examples of the user-confirmed-level anomaly command may include commands for deleting non-critical files.

Referring to FIG. 7, in step S601, the user 1 may attempt to execute an input anomaly command, i.e., the user-confirmed-level anomaly command, through the terminal. In step S602, the bastion worker 130 may determine whether the execution of user-confirmed-level anomaly commands is permitted. For example, if the user 1 has the authority to execute user-confirmed-level anomaly commands or if the procedure for controlling user-confirmed-level anomaly commands has already been completed after step S604, it may be determined that the execution of user-confirmed-level anomaly commands is permitted, and then, the input anomaly command may be executed.

In step S603, the bastion EAMS 110 may record, in the storage 2, the history of anomaly command execution requests, indicating that the user 1 has requested the execution of an anomaly command. For example, the history of anomaly command execution requests may include the IP address of the target instance, the user 1's IP address and account information, the time when the user executed the input anomaly command, the level of the input anomaly command, and the pattern of the input anomaly command.

In step S604, the bastion EAMS 110 may notify the user 1 that the input anomaly command is blocked from execution and may display a popup for user verification to the user 1. In response to the user 1 clicking the Confirm button in step S605, the bastion manager 120 may transmit the anomaly command verification token included in the connection specifications to the bastion worker 130 in step S606. In step S607, the bastion worker 130 may check the validity of the received anomaly command verification token by determining whether the received anomaly command verification token matches the initially generated anomaly command verification token match.

If the received anomaly command verification token is determined valid in step S608, then in step S609, the bastion worker 130 may execute the input anomaly command for the target instance. Thereafter, in step S610, the bastion EAMS 110 may record, in the storage 2, the history of anomaly command executions, indicating that the user 1 has executed an anomaly command. For example, the history of anomaly command executions may include the IP address of the target instance, the user 1's IP address and account information, the time when the user 1 clicked the Confirm button, the time when the user 1 executed the input anomaly command, the level of the input anomaly command, and the pattern of the input anomaly command. Finally, in step S611, the bastion EAMS 110 may output the results of the execution of the input anomaly command to the user 1's terminal.

Figure 8:
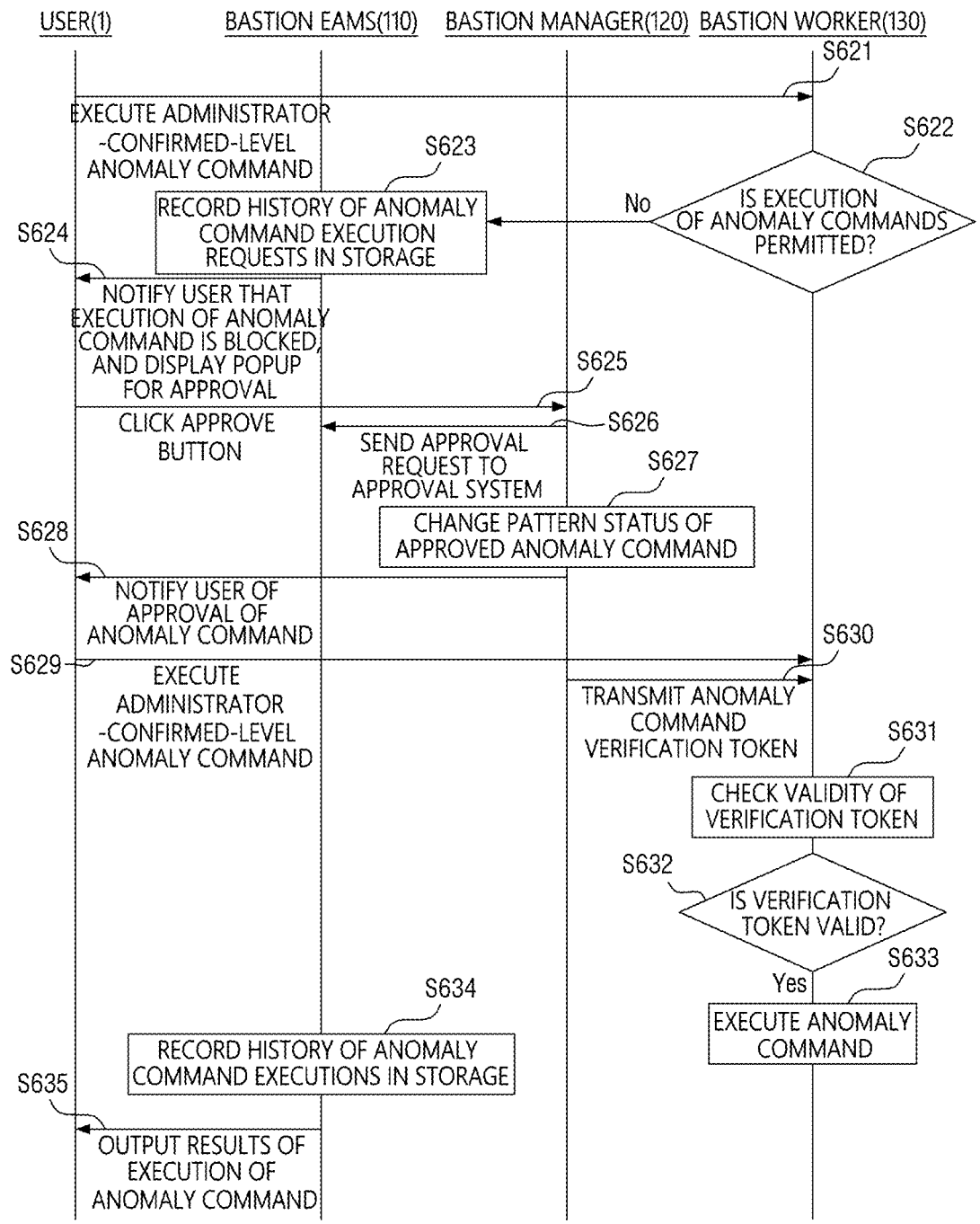
FIG. 8 is a flowchart illustrating step S600 of FIG. 3, which involves notifying the user of a procedure for approving the execution of an administrator-confirmed-level anomaly command and either executing and blocking the administrator-confirmed-level anomaly command based on the results of performing the notified procedure.

FIG. 8 is a flowchart illustrating step S600 of FIG. 3, which involves notifying the user 1 of a procedure for approving the execution of an administrator-confirmed-level anomaly command and either executing and blocking the administrator-confirmed-level anomaly command based on the results of performing the notified procedure. Here, the administrator-confirmed-level anomaly command may be a critical command that requires approval from a higher-level administrator than the user 1. Examples of the administrator-confirmed-level anomaly command may include commands for changing settings related to instance access.

Referring to FIG. 8, in step S621, the user 1 may attempt to execute an input anomaly command, i.e., the administrator-confirmed-level anomaly command, through the terminal. In step S622, the bastion worker 130 determines whether the execution of administrator-confirmed-level anomaly commands is permitted. For example, if the user 1 has the authority to execute administrator-confirmed-level anomaly commands or if the procedure for controlling administrator-confirmed-level anomaly commands has already been completed after step S624, it may be determined that the execution of administrator-confirmed-level anomaly commands is permitted, and then, the input anomaly level anomaly command may be executed.

In step S623, the bastion EAMS 110 may record, in the storage 2, the history of anomaly command execution requests, indicating that the user 1 has requested the execution of an anomaly command. For example, the history of anomaly command execution requests may include the IP address of the target instance, the user 1's IP address and account information, the time when the user 1 requested the execution of the input anomaly command, the level of the input anomaly command, and the pattern of the input anomaly command.

In step S624, the bastion EAMS 110 may notify the user 1 that the input anomaly command is blocked from execution and may display a popup requesting approval from a higher-level administrator. In response to the user 1 clicking the Approve button in step S625, the bastion manager 120 may send an approval request to an approval system in step S626. For example, the approval request may include the IP of the target instance, the user 1's account information, and the input anomaly command. In step S627, if the execution of the input anomaly command is approved by a higher-level administrator, the pattern status of the input anomaly command may be changed (e.g., from "not approved" to "approved").

If the execution of the input anomaly command is approved, the bastion manager 120 may notify the user 1 of the approval in step S628, and the user 1 may attempt to execute the input anomaly command in step S629. In step S630, the bastion manager 120 may transmit the anomaly command verification token included in the connection specification to the bastion worker 130. In step S631, the bastion worker 130 checks the validity of the received anomaly command verification token by determining whether the received anomaly command verification token matches the initially generated anomaly command verification token.

If the received anomaly command verification token is determined valid in step S632, then in step S633, the bastion worker 130 may execute the input anomaly command for the target instance. Thereafter, in step S634, the bastion EAMS 110 may record, in the storage 2, the history of anomaly command executions, indicating that the user 1 has executed an anomaly command. For example, the history of anomaly command executions may include the IP address of the target instance, the user 1's IP address and account information, the time when the execution of the input anomaly command was approved, the time when the user 1 executed the input anomaly command, the level of the input anomaly command, and the pattern of the input anomaly command. Finally, in step S635, the bastion EAMS 110 may output the results of the execution of the input anomaly command to the user 1's terminal.

Figure 9:
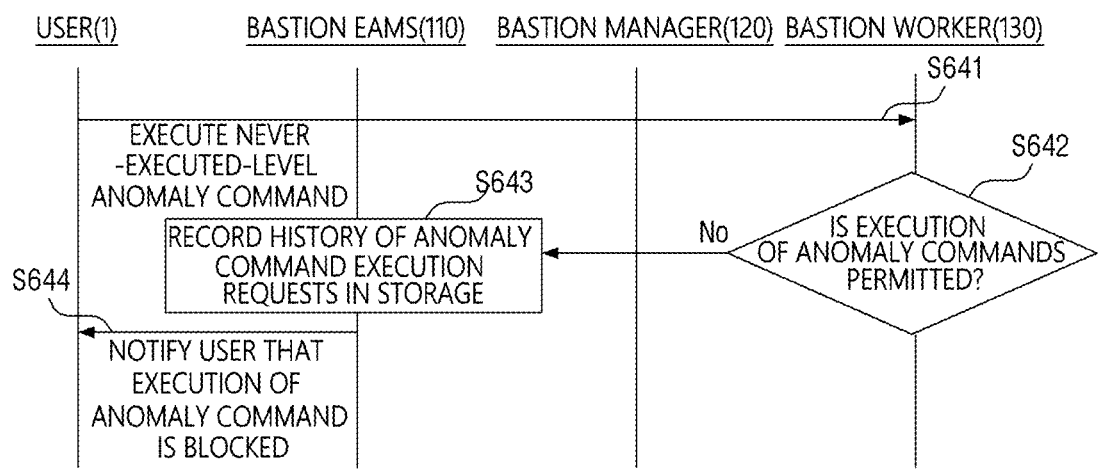
FIG. 9 is a flowchart illustrating step S600 of FIG. 3, which involves notifying the user of a procedure for approving the execution of a never executed level anomaly command and either executing and blocking the never executed level anomaly command based on the results of performing the notified procedure.

FIG. 9 is a flowchart illustrating step S600 of FIG. 3, which involves notifying the user 1 of a procedure for approving the execution of a never executed level anomaly command and either executing and blocking the never executed level anomaly command based on the results of performing the notified procedure. Here, the never executed level anomaly command may be a command that must not be executed to maintain the integrity of the cloud service. Examples of the never executed level anomaly command may include commands for formatting all instances or deleting instances, and the never executed level anomaly command may only be executed exceptionally by the highest-level administrator.

Referring to FIG. 9, in step S641, the user 1 may attempt to execute an input anomaly command, i.e., the never executed level anomaly command, through the terminal. In step S642, the bastion worker 130 may determine whether the execution of never executed level anomaly commands is permitted. For example, if the user 1 is the highest-level administrator of the cloud service with the authority to execute never executed level anomaly commands, it may be determined that the execution of never executed level anomaly commands is permitted, and then, the input anomaly command may be executed. However, if not, the input anomaly command may never be executed.

In step S643, the bastion EAMS 110 may record, in the storage 2, the history of anomaly command execution requests, indicating that the user 1 has requested the execution of an anomaly command. For example, the history of anomaly command execution requests may include the IP address of the target instance, the user 1's IP address and account information, the time when the user 1 requested the execution of the input anomaly command, the level of the input anomaly command, and the pattern of the input anomaly command. In step S644, the bastion EAMS 110 may notify the user 1 that the input anomaly command is blocked from execution.

Figure 10:
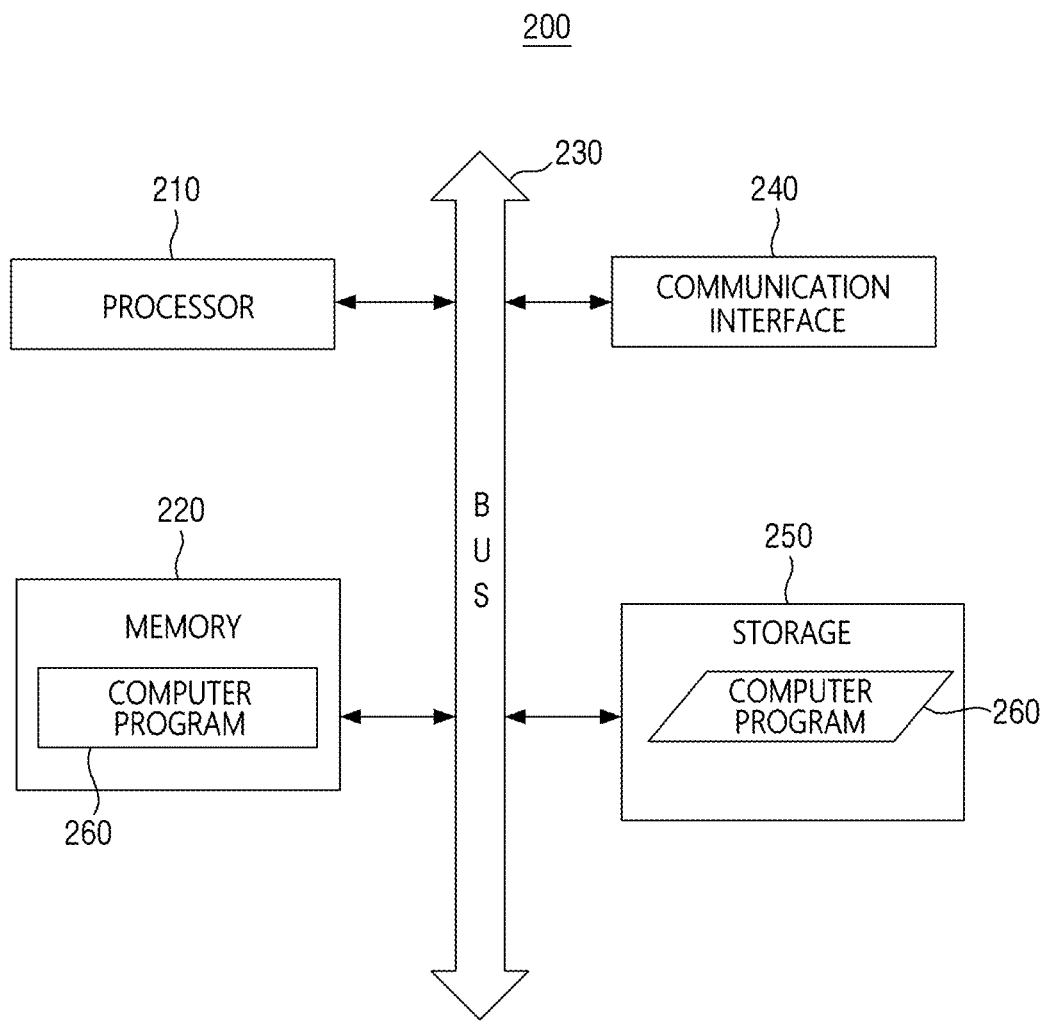
FIG. 10 is a block diagram illustrating the hardware configuration of a computing device for controlling and executing an anomaly command in a multi-network environment according to an embodiment of the present disclosure.

FIG. 10 is a block diagram illustrating the hardware configuration of a computing device 200 for controlling and executing an anomaly command in a multi-network environment according to an embodiment of the present disclosure. The embodiment of FIG. 10 will hereinafter be described with reference further to FIGS. 1 and 2.

Referring to FIG. 10, the computing device 200 may include at least one processor 210, a bus 230, a communication interface 240, a memory 220, which loads a computer program 260 executed by the processor 210, and a storage 250, which stores the computer program 260. However, FIG. 10 illustrates only relevant components to the present disclosure. Therefore, it is obvious to one of ordinary skill in the art to which the present disclosure pertains that the computing device 200 may further include other generic components than those depicted in FIG. 10. In other words, the computing device 200 may also include various other components to those depicted in FIG. 10. Additionally, the computing device 200 may be configured without some of the components depicted in FIG. 10. The components of the computing device 200 will hereinafter be described.

The processor 210 may control the overall operations of the components of the computing device 200. The processor 210 may be configured to include at least one of a Central Processing Unit (CPU), a Micro Processor Unit (MPU), a Micro Controller Unit (MCU), a Graphic Processing Unit (GPU), or any type of processor well known in the field of the present disclosure. Moreover, the processor 210 may perform computations for at least one application or program for executing operations/methods according to some embodiments of the present disclosure. The computing device 200 may be equipped with at least one processor 210.

The memory 220 may store various data, instructions, and/or information. The memory 220 may load the computer program 260 from the storage 250 to execute the operations/methods according to some embodiments of the present disclosure. The memory 220 may be implemented as a volatile memory such as a random-access memory (RAM), but the present disclosure is not limited thereto.

The bus 230 may provide communication functions between the components of the computing device 200. The bus 230 may be implemented in various forms such as an address bus, a data bus, and a control bus.

The communication interface 240 may support wired or wireless internet communications for the computing device 200. Moreover, the communication interface 240 may support various communication methods besides Internet communication. For this purpose, the communication interface 240 may be configured to include a communication module well-known in the technical field of the present disclosure.

The storage 250 may non-transiently store the computer program 260. The storage 250 may be configured to include a non-volatile memory such as a Read-Only Memory (ROM), an Erasable Programmable ROM (EPROM), an Electrically Erasable Programmable ROM (EEPROM), a flash memory, a hard disk, a removable disk, or any form of computer-readable recording medium well known in the technical field of the present disclosure.

The computer program 260 may include one or more instructions that, when loaded into the memory 220, allow the processor 210 to perform the operations/methods according to some embodiments of the present disclosure. That is, by executing the loaded instructions, the processor 210 may perform the operations/methods according to some embodiments of the present disclosure.

For example, the computer program 260 may include instructions for performing the operations of: accessing a bastion worker 130 through the bastion host 100; connecting to the target instance; extracting the command input by the user 1; determining whether the extracted command is an anomaly command; determining whether the execution of the anomaly command is permitted; notifying the user 1 that the execution of the anomaly command is blocked; and notifying the user 1 of a procedure for approving execution based on the level of the anomaly command (e.g., the user-confirmed, administrator-approved, or never-executed level); and either executing or blocking the input command by reflecting the results of performing the notified procedure.

According to the aforementioned embodiments of the present disclosure, the control and execution of anomaly commands in a multi-network environment can be performed through the computing device 200, and the user 1 can connect to each target instance through bastion workers 130 in other networks using the computing device 200.

According to the aforementioned embodiments of the present disclosure, a bastion host can not only serve as a proxy for network access but also perform functions for controlling and executing anomaly commands. Moreover, the operations according to the embodiments of the present disclosure can be uniformly applied to all deployed networks through the bastion host, thereby applying the same level of security policy across all networks.

Furthermore, the procedures for controlling anomaly commands and approving their execution according to the embodiments of the present disclosure can be integrated with various approval functions within cloud services, allowing for the execution and tracking of commands based on approvals. Since requests for the execution of anomaly commands and histories associated with the execution of anomaly commands are stored in a storage, it is possible to review information related to the control and execution of anomaly commands across all networks through the bastion host. Thus, security risks from malicious users can be minimized, and the inconvenience of installing agents individually on each and every instance for security can be eliminated.

Additionally, according to the embodiments of this disclosure, the level of the same anomaly commands may be determined differently depending on the user's rank, allowing for the control of anomaly commands that takes into consideration both the pattern of anomaly commands and the user's rank.

Various embodiments and the effects thereof according to the present disclosure have been mentioned with reference to FIGS. 1 through 10. The effects according to the technical spirit of the present disclosure are not limited to those mentioned above, and other effects not mentioned will be clearly understood by one of ordinary skill in the art from the description below.

While all components comprising the embodiments of the present disclosure have been described as being combined or operating in conjunction, it should not be understood that the present disclosure is limited to such embodiments. That is, within the scope of the objectives of the present disclosure, all such components can selectively be combined and operate in one or more configurations.

Although operations are illustrated in a specific order in the drawings, it should not be understood that the operations must be performed in that specific order or sequentially, or that all the illustrated operations are required to achieve desired results. In certain circumstances, multitasking and parallel processing may be advantageous. Furthermore, the separation of various components in the described embodiments should not be understood as necessary, and the described program components and systems can generally be integrated into a single software product or packaged into multiple software products.

While the embodiments of the present disclosure have been described with reference to the attached drawings, it will be understood by one skilled in the art that the present disclosure can be implemented in other specific forms without departing from the technical spirit or essential characteristics thereof. Therefore, the described embodiments should be considered in all respects as illustrative and not restrictive. The scope of the present disclosure is to be interpreted by the following claims, and all technical spirits within the equivalent scope are to be interpreted as included within the rights of the present disclosure.

What is claimed is:

1. A method of controlling and executing an anomaly command in a multi-network environment, performed by a computing device, the method comprising:
    accessing, through a bastion host, one of a plurality of bastion workers, located in subnets of a plurality of networks, and connecting to a target instance that is connected with the accessed bastion worker;
    extracting a command, which is input by a user to the target instance through the accessed bastion worker;
    comparing the extracted command with anomaly command patterns stored in the bastion host, and determining whether the extracted command is an anomaly command based on a result of the comparing;
    based on the extracted command being determined to be the anomaly command, determining whether an execution of the anomaly command is permitted in the target instance;
    based on the execution of the anomaly command being not permitted, notifying, through the bastion host, the user that the execution of the anomaly command is blocked; and
    notifying the user of a procedure for approving the execution of the anomaly command based on a level of the anomaly command being one of levels, which are classified in advance based on the anomaly command patterns, and either executing or blocking the command input by the user, wherein the procedure is determined differently depending on the level of the anomaly command.

2. The method of claim 1, wherein the connecting to the target instance comprises:
    completing user authentication by connecting to a bastion Equipment Account Management System (EAMS);
    issuing a request to connect to the target instance through a bastion manager;
    issuing, by the bastion manager, a request for connection specifications to the bastion EAMS in response to the request to connect to the target instance;
    generating and transmitting, by the bastion EAMS, the connection specifications to the bastion manager in response to the request for connection specifications;
    searching for and finding a bastion worker, among the plurality of bastion workers, that is connectable to the target instance; and
    accessing the found bastion worker by transmitting the connection specifications, and
    wherein the connection specifications include a domain of a network in which the target instance is located, an IP address and a port number of the target instance, an ID and a password of the user, and an anomaly command verification token.

3. The method of claim 1, wherein the extracting the command comprises:
    opening, by the accessed bastion worker, a terminal for the user by executing an application programming interface (API);
    inputting, by the user, the command through the terminal;
    transmitting, by a bastion Equipment Account Management System (EAMS), the command input by the user to the accessed bastion worker, wherein the command input by the user is in an image format; and
    extracting, by the accessed bastion worker, the command input by the user in text form by executing an API.

4. The method of claim 1, wherein the levels of the anomaly command classified in advance includes a first level, a second level, and a third level,
    wherein, based on the level of the anomaly command being the first level, the procedure is a first procedure for approving an execution of the anomaly command of the first level,
    wherein, based on the level of the anomaly command being the second level, the procedure is a second procedure for approving an execution of the anomaly command of the second level, and
    wherein, based on the level of the anomaly command being the third level, the execution of the anomaly command is blocked.

5. The method of claim 4, wherein the level of the anomaly command is the second level, and the either executing or blocking the command comprises:
    notifying the user that the execution of the anomaly command is blocked and displaying an item to approve the execution of the anomaly command, as the first procedure;
    in response to the user selecting the item, transmitting, by a bastion manager, an anomaly command verification token to a bastion worker connected with the target instance;
    checking, by the bastion worker connected with the target instance, a validity of the received anomaly command verification token by comparing the received anomaly command verification token with an initially generated anomaly command verification token generated upon a first access to the target instance; and
    based on a result of the comparing of the received anomaly command verification token indicating a match, determining the received anomaly command verification token as being valid and executing the anomaly command.

6. The method of claim 4, wherein the level of the anomaly command is the second level, and the either executing or blocking the command input comprises:

notifying the user that the execution of the anomaly command is blocked and displaying an item to request an approval of the execution of the anomaly command, as the second procedure;

in response to the user selecting the item, issuing, by a bastion manager, an approval request to a higher-level administrator of the user;

based on an approval from the higher-level administrator, transmitting an anomaly command verification token to a bastion worker connected with the target instance;

checking, by the bastion worker connected with the target instance, a validity of the received anomaly command verification token by comparing the received anomaly command verification token with an initially generated anomaly command verification token generated upon a first access to the target instance; and based on the result of the comparing of received anomaly command verification token indicating a match, determining the received anomaly command verification token as being valid and executing the anomaly command.

7. The method of claim 4, wherein the level of the anomaly command is the third level, the either executing or blocking the command comprises notifying the user that the execution of the anomaly command is blocked.

8. The method of claim 1, further comprising:
recording a history of anomaly command execution requests in a storage; and
recording a history of anomaly command executions in the storage,
wherein the history of anomaly command execution requests includes an IP address of the target instance, an IP address and account information of the user, a time when the user requested the execution of the anomaly command, the level of the anomaly command, and a pattern of the anomaly command, and
wherein the history of anomaly command executions includes a time when the user completed the procedure, a time when the user executed the anomaly command, the level of the anomaly command, and the pattern of the anomaly command.

9. The method of claim 1, wherein the level of the anomaly command is additionally determined differently depending on a rank of the user.

10. A system, for controlling and executing an anomaly command in a multi-network environment, comprising:
a plurality of networks each including a subnet, the subnet including a bastion worker and a plurality of instances connected with the bastion worker; and
a user network including a bastion host for a user to access bastion workers of the plurality of networks,
wherein the bastion host is implemented using a computing device comprising a memory, and includes:
a bastion Equipment Account Management System (EAMS) configured to transmit a request to connect to a target instance among the plurality of instances and includes anomaly command patterns for determining whether a command input by the user to the target instance is an anomaly command; and
a bastion manager configured to search for and find a bastion worker connected with the target instance in response to the request to connect to the target instance from the bastion EAMS, and access the found bastion worker,
wherein the accessed bastion worker is configured to extract the command input by the user to the target instance, compare the extracted command with the anomaly command patterns stored in the EAMS, and determine whether the command input by the user to the target instance is the anomaly command based on a result of comparing, and notify the user, through the bastion manager, of a procedure for approving an execution of the anomaly command, based on a level of the anomaly command being one of levels, which are classified in advance by the anomaly command patterns, and
wherein the procedure varies depending on the level of the anomaly command.

11. The system of claim 10, wherein the command input by the user is transmitted to the accessed bastion worker via WebSocket and output in a form of an image, and
wherein the accessed bastion worker is configured to extract the command from the command output in the form of the image and determine the command input by the user as the anomaly command based on a result of comparing indicating a match.

12. The system of claim 10, wherein the bastion EAMS is configured to generate an anomaly command verification token based on the user first connecting to the target instance and transmit the anomaly command verification token to the bastion manager, and
wherein the bastion manager includes an anomaly command control module, which is configured to transmit the anomaly command verification token to the accessed bastion worker in performing the procedure.

13. The system of claim 12, wherein the levels of the anomaly command classified in advance includes a first level, a second level, and a third level,
wherein, based on the level of the anomaly command being the first level, the procedure is a first procedure for approving an execution of the anomaly command of the first level,
wherein, based on the level of the anomaly command being the second level, the procedure is a second procedure for approving an execution of the anomaly command of the second level, and
wherein, based on the level of the anomaly command being the third level, the execution of the anomaly command is blocked.

14. The system of claim 13, wherein the level of the anomaly command is the first level,
wherein the bastion EAMS is configured to notify the user that the execution of the anomaly command is blocked, and display an item to approve the execution of the anomaly command, as the first procedure,
wherein, in response to the user selecting the item, the anomaly command control module is configured to transmit the anomaly command verification token to the accessed bastion worker, and
wherein the accessed bastion worker is configured to check a validity of the received anomaly command verification token by comparing the received anomaly command verification token with an initially generated anomaly command verification token generated upon a first access to the target instance, and execute the anomaly command based on a result of the comparing of the received anomaly command verification token indicating a match.

15. The system of claim 13, wherein the level of the anomaly command is the second level,
wherein the bastion EAMS is configured to notify the user that the execution of the anomaly command is blocked, and display an item to request an approval of the execution of the anomaly command, as the second procedure, wherein, in response to the user selecting the item, the bastion manager is configured to transmit an approval request to a higher-level administrator of the user, wherein, based on an approval from the higher-level administrator, the anomaly command control module is configured to transmit the anomaly command verification token to the accessed bastion worker, and wherein the accessed bastion worker is configured to check a validity of the received anomaly command verification token by comparing the received anomaly command verification token with an initially generated anomaly command verification token generated upon a first access to the target instance, and execute the anomaly command based on a result of comparison of the received anomaly command verification token indicating a match.

16. The system of claim 13, wherein the level of the anomaly command is the third level, and the bastion EAMS is configured to notify the user that the execution of the anomaly command is blocked.

17. The system of claim 10, wherein the level of the anomaly command is additionally determined differently depending on a rank of the user.

18. A non-transitory computer-readable recording medium storing computer program, the computer program being executable by at least one processor to perform:

accessing, through a bastion host, one of a plurality of bastion workers, located in subnets of multiple networks and connecting to a target instance that is connected with the accessed bastion worker;

extracting a command, which is input by a user to the target instance through the accessed bastion worker;

comparing the extracted command with anomaly command patterns stored in the bastion host, and determining whether the extracted command is an anomaly command based on a result of the comparing;

based on the extracted command being determined to be an anomaly command, determining whether the execution of the anomaly command is permitted in the target instance;

based on the execution of the anomaly command not being permitted, notifying the user through the bastion host that the execution of the anomaly command is blocked; and notifying the user of a procedure for approving the execution of the anomaly command based on a level of the anomaly command being one of levels, which are classified in advance based on the anomaly command patterns, and either executing or blocking the command input by the user, wherein the procedure is determined differently depending on the level of the anomaly command.

19. The non-transitory computer-readable recording medium of claim 18, wherein the levels of the anomaly command classified in advance includes a first level, a second level, and a third level, wherein, based on the level of the anomaly command being the first level, the procedure is a first procedure for approving an execution of the anomaly command of the first level, wherein, based on the level of the anomaly command being the second level, the procedure is a second procedure for approving an execution of the anomaly command of the second level, and wherein, based on the level of the anomaly command being the third level, the execution of the anomaly command is blocked.

20. The non-transitory computer-readable recording medium of claim 18, wherein the level of the anomaly command is additionally determined differently depending on a rank of the user.

\* \* \* \* \*